US012032701B2

(12) United States Patent
Goodman et al.

(10) Patent No.: US 12,032,701 B2
(45) Date of Patent: Jul. 9, 2024

(54) METHOD FOR PREVENTING MALICIOUS CONFIGURATIONS BY CRYPTOGRAPHICALLY SECURING VALIDATED BOOT IMAGE USING MUTABLE COPY OF AN IMMUTABLE SET OF CONFIGURATIONS

(71) Applicant: Dell Products L.P., Round Rock, TX (US)

(72) Inventors: Bradley K. Goodman, Nashua, NH (US); Joseph Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 182 days.

(21) Appl. No.: 17/864,512

(22) Filed: Jul. 14, 2022

(65) Prior Publication Data

US 2024/0020388 A1 Jan. 18, 2024

(51) Int. Cl.
*G06F 21/57* (2013.01)

(52) U.S. Cl.
CPC ...... *G06F 21/575* (2013.01); *G06F 2221/034* (2013.01)

(58) Field of Classification Search
CPC ......................... G06F 21/575; G06F 2221/034
See application file for complete search history.

(56) References Cited

U.S. PATENT DOCUMENTS

| | | | | |
|---|---|---|---|---|
| 11,194,913 | B2 * | 12/2021 | Gupta | G06F 21/123 |
| 11,853,429 | B2 * | 12/2023 | Volos | G06F 21/572 |
| 2020/0151336 | A1 * | 5/2020 | Maletsky | G06F 21/575 |
| 2023/0325509 | A1 * | 10/2023 | Schroder | G06F 21/602 726/26 |

* cited by examiner

*Primary Examiner* — Tammara R Peyton
(74) *Attorney, Agent, or Firm* — Womble Bond Dickinson (US) LLP

(57) ABSTRACT

Systems, apparatuses, methods, and computer program products are disclosed for managing operations of data processing systems to prevent implementation of malicious configurations. An example method includes constructing, by a data processing system, a validated change log and reconstructing known good configurations by replaying the validated configuration changes from the validated change log. The example method further includes making a determination, by the data processing system, regarding whether the source of a configuration change request has enough privilege to make the configuration request, and validating the request should the source have enough privilege.

20 Claims, 11 Drawing Sheets

Boot Image 630

Immutable Section 632

Mutable Section 634

Configuration File 1
Configuration File 2
Configuration File 3
Configuration File 4
Configuration File 5
Malicious Configuration File
Configuration File 7
Configuration File 8

Reconstructed Configuration Files 640

Configuration File 1
Configuration File 2
Configuration File 3
Configuration File 4
Configuration File 5

Configuration File 7
Configuration File 8

METHOD FOR PREVENTING MALICIOUS CONFIGURATIONS BY CRYPTOGRAPHICALLY SECURING VALIDATED BOOT IMAGE USING MUTABLE COPY OF AN IMMUTABLE SET OF CONFIGURATIONS

FIELD

Embodiments disclosed herein relate generally to information security. More particularly, embodiments disclosed herein relate to systems and methods to manage operation of a data processing system to prevent implementation of malicious configurations.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
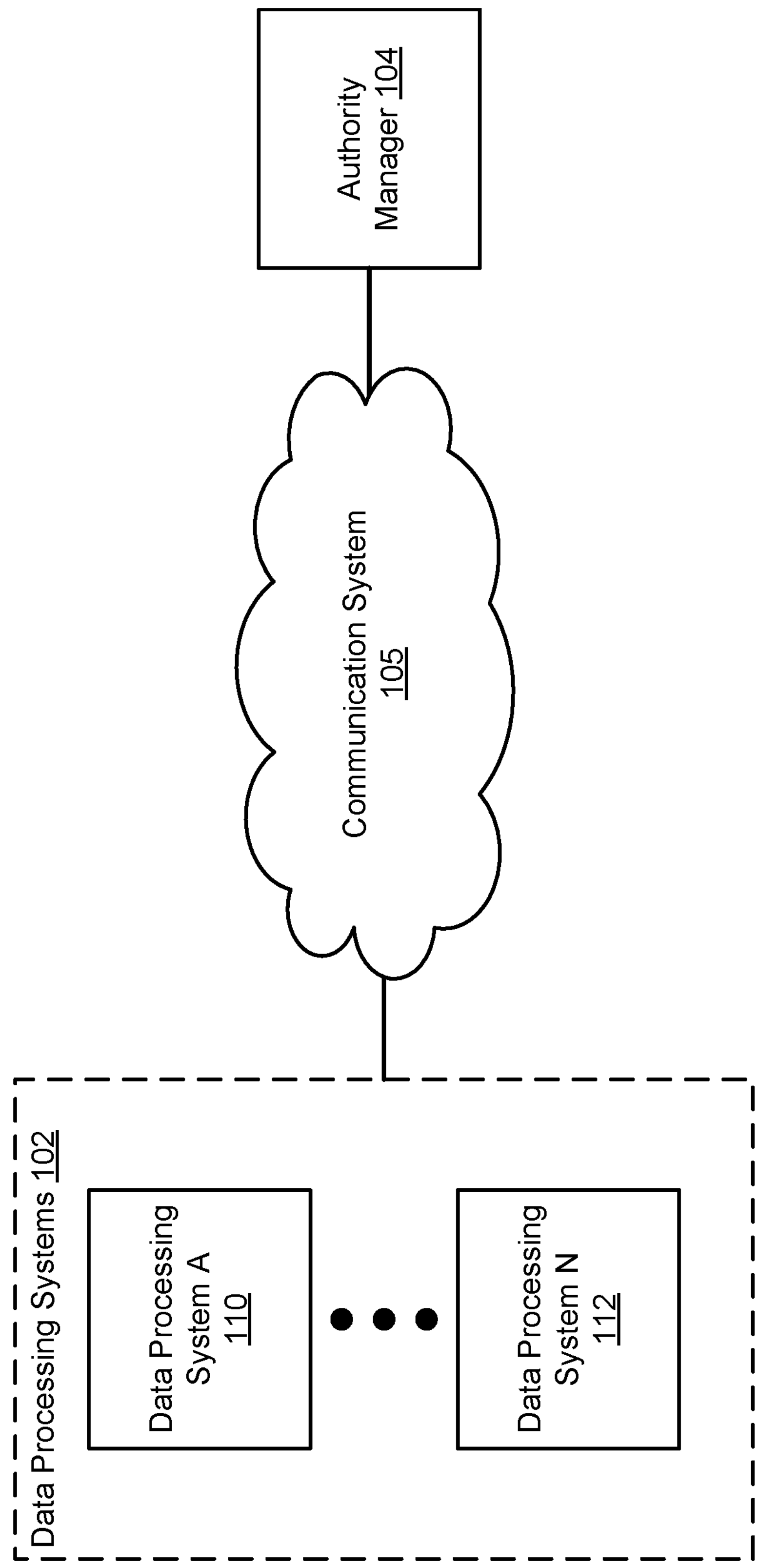
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for providing computer-implemented services. To provide the computer-implemented services, a data processing system may need to operate in a predetermined manner. The manner of operation of a data processing system may be configured through implementation of various configuration settings. Modification of the configuration settings may cause the data processing system to operate in manners different from the predetermined manner.

To reduce the likelihood of the configuration settings of the data processing from being modified in an undesirable manner, the data processing system may track valid configuration changes and used the tracked validated changes to construct a known good set of configurations used by the data processing system in its operation. By doing so, configuration changes that are not validated (which may be made by malicious parties) may be prevented from impacting the operation of the data processing system even though configuration files that include configurations settings may be changed by the configuration changes that are not validated.

By using known good configurations rather than configurations defined by configuration files that may include malicious or configurations that have not been validated, embodiments disclosed herein may provide a data processing system that is more likely to operate in a manner conducive to providing the desired computer-implemented services. Thus, embodiments disclosed herein may address, at least in part, the technical problem of security threats in distributed environments which may attempt to compromise a data processing system through implementation of configuration changes that may expose the data processing system to various type of security risks/threats.

In an embodiment, a computer-implemented method for managing operation of a data processing system to prevent implementation of malicious configurations is provided. The method may include obtaining, by a start-up manager of the data processing system, a boot image comprising an immutable section and a mutable section comprising a malicious configuration of the malicious configurations; obtaining, by the start-up manager, a configuration journal comprising an immutable base set of configurations and a cryptographically secure validated change log; obtaining, by the start-up manager, a mutable copy of the immutable base set of configurations; constructing, by the start-up manager, validated configurations using the mutable copy of the immutable configurations and cryptographically secure validated changes from the cryptographically secure validated change log; and directing, by the start-up manager, an operations manager to use the validated configurations instead of configurations from the mutable section of the boot image, the configurations from the mutable section of the boot image comprising the malicious configuration.

The computer-implemented method may also include prior to obtaining the boot image; obtaining, by the operations manager, a configuration change request from a privileged user; making a determination, by the operations manager, that the configuration change request from the privileged user is validated; implementing, by the operations manager and based on the determination, any configuration changes indicated by the configuration change request from the privileged user; and updating, by the operations manager, the cryptographically secure validated change log based on the configuration changes indicated by the configuration change request.

The computer-implemented method may also include prior to obtaining the boot image; obtaining, by the operations manager, a second configuration change request; making a second determination, by the operations manager, that the second configuration change request is not validated; and rejecting, by the operations manager and based on the second determination, the second configuration change without adding any information regarding the second configuration change request to the cryptographically secure validated change log.

The determination may be made by: identifying a required level of privilege for the configuration changes indicated by the configuration change request; and identifying that the privileged user has a level of privilege meeting the required level of privilege.

The cryptographically securing the validated change log comprises: adding an entry to the cryptographically secure validated change log, the entry indicating a temporal relationship to other entries of the cryptographically secure validated change log; adding information regarding the configuration changes indicated by the configuration change request to the added entry; and establishing cryptographic security for the added entry.

Establishing the cryptographic security may include: generating a signature for the added entry, the signature being generated, at least in part, using an identifier of the privileged user; and associating the generated signature with the added entry.

Establishing the cryptographic security may also include: generating a cryptographic link between the added entry and another entry of the cryptographically secure validated change log. The other entry of the cryptographically secure validated change log is an immediately temporally junior entry of the cryptographically secure validated change log to the added entry.

The malicious configuration of the malicious configurations may be implemented by an entity that does not have sufficient privilege to make the malicious configuration.

The entity may include a malicious computer application hosted by the data processing system.

The computer-implemented method may also include handing off operation of the data processing system to the operations manager, the operations manager exclusively using the validated configurations to define the operations manager's operation and ignoring the malicious configuration change to define the operations manager's operation.

In an embodiment, a non-transitory media that include instructions that when executed by a processor cause the computer-implemented method to be performed is provided.

In an embodiment, a data processing system that includes the non-transitory media and a processor, and performs the computer-implemented method when the instructions are executed by the processor is provided.

Turning to FIG. 1, a block diagram illustrating a system in accordance with an embodiment is shown. The system shown in FIG. 1 may provide computer implemented services that may utilize data collected from various sources throughout a distributed environment (e.g., one or more devices connected to one another that may operate independently or in cooperation with one another).

To provide the computer implemented services, the system may include data processing systems 102. Data processing systems 102 may provide all, or a portion, of the computer implemented services. Data processing systems 102 may include any number of data processing systems that provide computer implemented services. For example, data processing systems 102 may include one or more of data process system A 110 through data processing system N 112 that may independently and/or cooperatively provide the computer implemented services.

For example, all, or a portion, of data processing system 102 may provide computer implemented services to users of data processing systems 102 and/or other computing devices operably connected to data processing systems 102. The computer implemented services may include any type and quantity of services including, for example, database services, instant messaging services, video conferencing services, etc. Different systems may provide similar and/or different computer implemented services.

To provide the computer implemented services, data processing system 110-112 may host applications that provide these (and/or other) computer implemented services. The applications may be hosted by one or more of data processing system 110-112 of data processing system 102. As part of the operation of the applications, the applications may utilize or be influenced by various configurations of data processing systems 102. For example, the configurations may define an environment in which the applications operate. Different configurations for this environment may expose the applications to greater or lesser degrees of risk with respect to, for example, compromise of data, undesired operation of the applications, etc.

Any of data processing system 110-112, and components thereof, as well as hosted entities (e.g., applications that provide computer implemented services, other applications that manage the operation of data processing systems 102, etc.) may be subject to undesired operation due to the configurations of data processing systems 102. For example, configurations for data processing systems may be included in configuration files. These configuration files may include information that defines how data processing systems 102 will operate. For example, the information in the configuration files may introduce various operating conditions that are undesirable. For example, a malicious party may attempt to use configurations to weaken security against various threats, to gain access to otherwise secure information, and/or to otherwise compromise data processing systems 102.

In general, embodiments disclosed herein may provide systems, devices, and methods for proactively managing operations of data processing systems 102 to reduce the likelihood of implementation of malicious configurations (or configuration changes that are not otherwise validated as being unlikely to be malicious). To proactively manage the operation of data processing systems, a data processing system in accordance with an embodiments may (i) establish a log of validated changes to configuration files and a base image of the configuration files in a known good state, (ii) during startup procedures, reconstruct known good configuration files based on the base image and the log of the validated changes to the configuration files, (iii) to prepare for hand off to an operations manager following the startup procedures, load an image that my include configuration files that may be compromised, (iv) direct an operations manager of the loaded image to use the reconstructed known good configuration files rather than the configuration files that may be compromised, and (v) hand off operation of the data processing system to the operations manager so that the operations manager utilizes the reconstructed known good configuration files rather than the configuration files that may be compromised. By doing so, embodiments disclosed herein may reduce the likelihood of compromised configuration files from being used in the operation of data processing systems.

To do so, the system of FIG. 1 may include, at noted above, any number of data processing systems 102 and authority manager 104. Data processing systems 102 and authority manager 104 may cooperate to discriminate valid configuration changes from unauthorized configuration changes.

Authority manager 104 may cooperate with data processing systems 102 by acting as a source of authority within the system of FIG. 1.

To provide its functionality, authority manager 104 may (i) obtain configuration change requests, (ii) determine whether entities requesting the configuration changes have sufficient privileges for the configuration changes to be implemented, (iii) for configuration changes requested by entities having sufficient privileges, implement the configuration changes (e.g., by modifying configuration files or authorizing modification of the corresponding configuration files) and record the configuration change in a log in a cryptographically secure form (or initiate the recordation by another entity through authorization of the configuration change), and/or (iv) facilitate cryptographic validation of the cryptographically secure configuration changes in the log (and/or a copy of the base configuration image which may be used in conjunction with the configuration changes to obtain a copy of configuration files in a known good state). By doing so, authority manager 104 may increase a likelihood of data processing systems 102 using uncompromised configuration files during operation.

To provide the above noted functionality, authority manager 104 may include various functionalities including, for example, one or more of (i) key generation, (ii) key exchange, (iii) key storage, (iv) secure key description, and (v) key replacement. For example, authority manager 104 may (or may facilitate other entities to) cryptographically sign each new addition (e.g., added entry) to the logs as validated configuration changes are added to the log. The cryptographic signatures, linked to respective additions (e.g., added entries) to the logs, may reduce the likelihood of data processing systems 102 operating in an undesired manner due to the malicious configurations.

Figure 2A:
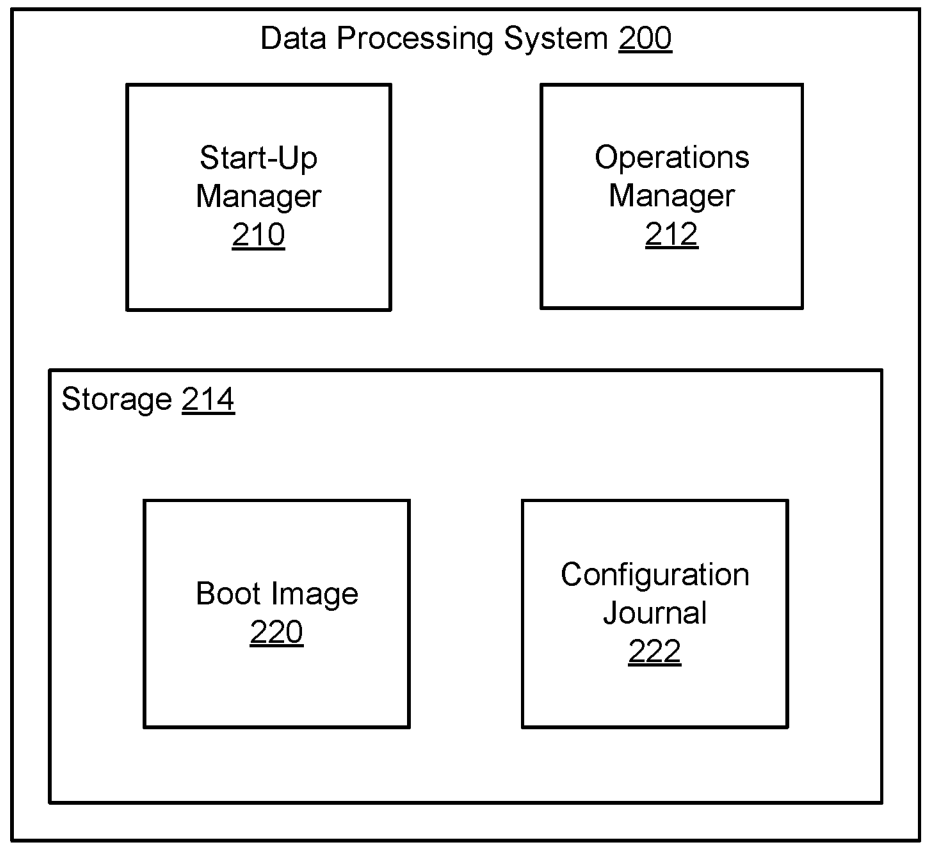
FIG. 2A shows a block diagram illustrating a data processing system in accordance with an embodiment.

Data processing systems 102, as noted above, may cooperate with authority manager 104 to facilitate use of validated configuration files in operation. To do so, data processing systems 102 may (i) discriminate valid configuration changes from other configuration changes, (ii) log the validated configuration changes, and (iii) use the logged validated configuration changes to reconstruct a known good copy (or at least believed to be known good) of configuration. Refer to FIG. 2A for additional details regarding data processing systems 102.

When providing its functionality, authority manager 104 and/or any of data processing systems 102 may perform all, or a portion, of the methods, operations, and/or actions shown in FIGS. 3-6B.

Data processing systems 102, data processing system 110-112, and/or authority manager 104 may be implemented using a computing device such as a host or server, a personal computer (e.g., desktops, laptops, and tablets), a “thin” client, a personal digital assistant (PDA), a Web enabled appliance, or a mobile phone (e.g., Smartphone), an embedded system, local controllers, and/or any other type of data processing device or system.

Any of the components illustrated in FIG. 1 may be operably connected to each other (and/or components not illustrated) with communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Turning to FIG. 2A, a diagram of data processing system 200 in accordance with an embodiment is shown. Data processing system 200 may be similar to any of data processing systems 102. Data processing system 200 may provide computer implemented services, as noted above. To reduce the likelihood of data processing system 200 being compromised, data processing system 200 may provide operations management services. The operations management services may provide for proactive identification of validated changes to configuration files and/or remediation of undesired configurations (e.g., malicious configurations) that may be implemented by the configuration files. To provide its functionality, data processing system 200 may include start-up manager 210, operations manager 212, and storage 214. Each of these components is discussed below.

Start-up manager 210 may (e.g., to provide all, or a portion, of the operations management services): (i) load into memory, from storage 214, boot image 220 (the boot image including configuration files that may have not been validated and may include malicious configurations), (ii) load into memory, from storage 214, a mutable copy of an immutable base set of configurations (e.g., from configuration journal 222) and modify the mutable copy of an immutable base set of configurations using validated configuration changes from a cryptographically secure validated change log (e.g., from configuration journal 222) using the authority manager 104 (mentioned previously with respect to FIG. 1 and will be further discussed with respect to FIG. 5) to obtain a known good set of configurations (which may be implemented with any number of configuration files), (iii) direct operations manager 212 to utilize the known good set of configurations instead of configurations (which may be implemented with any number of configuration files) from boot image 220 that may include malicious configurations to obtain an updated operations manager, and (vi) hand off management of the data processing system to the updated operations manager (which may replace operations manager 212 in FIG. 2A).

When providing its functionality, start-up manager 210 may utilize validation services provided by authority manager 104, configuration journal 222, and/or boot image 220. Configuration journal 222 may include an immutable base set of configuration files (e.g., a previous known good set of configurations such as those provided by a vendor) and, as noted above, the cryptographically secure validated change log, while the boot image 220 may include mutable section (which may include configurations that may include malicious configurations) and other sections (which may include computer instructions corresponding to applications such as operations manager 212).

Figure 2B:
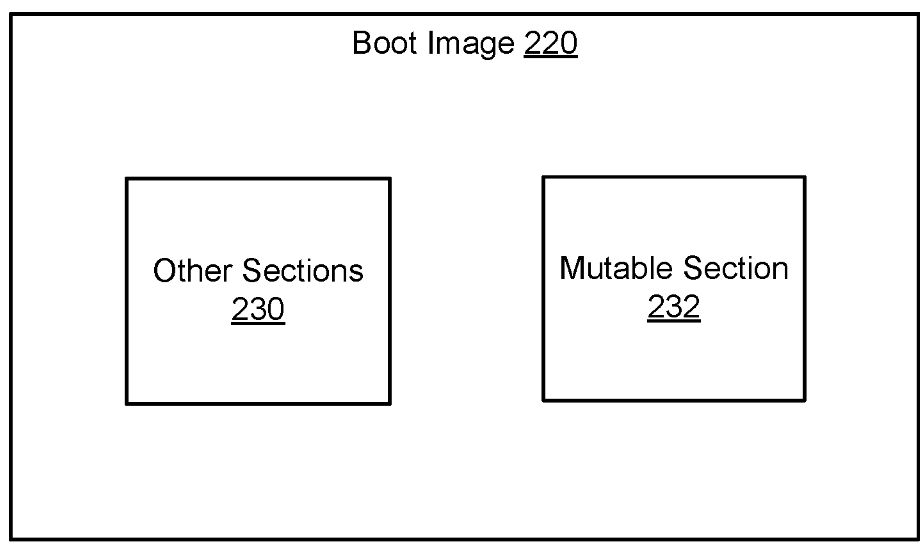
FIG. 2B shows a block diagram illustrating a boot image in accordance with an embodiment.

For additional details regarding boot image 220, refer to FIG. 2B. For additional details regarding configuration journal 222, refer to FIG. 2C.

As noted above, operations manager 212 may assist in the management of configurations of data processing system 200 while providing its functionality. To provide its functionality, operations manager 212 may (e.g., to provide all, or a portion, of the operations management services): (i) take over operations management services from start-up manager 210 at the hand-off and after it has been updated to utilize the known good set of configurations, (ii) use the known good set of configurations as a replacement for the configurations from boot image 220 which may include malicious configurations, (iii) load all, or a portion of, hosted entities (e.g., applications that may provide desired computer implemented services) into data processing system 200 using the known good set of configurations rather than the configurations from boot image 220, (iii) once the hosted entities are functioning (as part of a post boot phase which begins after hand-off to operations manager 212), obtain request(s) for changes to configurations of data processing system 200, (iv) validate the request(s) for the changes using authority manager 104, and discriminate against request(s) that cannot be validated (e.g., by discarding them or otherwise not implementing the configuration changes indicated by the configuration requests), (v) implement the configuration changes indicated by all of the requests for changes that are validated, and (vi) add cryptographically secure information (e.g., information regarding the implemented change to the configurations so that the implemented changes may be made again, e.g., replayed; information indicating an ordering of the change with respect to other changes to the configurations so that all validated changes may be replayed in the same order in which they are made; and/or cryptographic information usable to validate whether the added information is valid) regarding the configuration changes made based on validated change requests to the cryptographically secure change log. By doing so, a system in accordance with an embodiments disclosed herein may facilitate reconstruction of known good sets of configuration files that are less likely to include malicious configurations, and use the reconstructed known good sets of configuration files during operation.

When providing it functionality, operations manager 212 may utilize authority manager 104, configuration journal 222, and/or boot image 220

In an embodiment, one or more of start-up manager 210 and operations manager 212 is implemented using a hardware devices including circuitry. The hardware devices may be, for example, digital signal processors, a field programmable gate arrays, or an application specific integrated circuits. The circuitry may be adapted to cause the hardware devices to perform the functionality of start-up manager 210 and/or operations manager 212. Start-up manager 210 and/or operations manager 212 may be implemented using other types of hardware devices without departing from embodiments disclosed herein.

In one embodiment, one or more of start-up manager 210 and operations manager 212 is implemented using a processor adapted to execute computing code stored on a persistent storage that when executed by the processor performs the functionality of start-up manager 210 and/or operations manager 212 discussed throughout this application. The processor may be a hardware processor including circuitry such as, for example, a central processing unit or a microcontroller. The processor may be other types of hardware devices for processing digital information without departing from embodiments disclosed herein.

In an embodiment, storage 214 is implemented using physical devices that provide data storage services (e.g., storing data and providing copies of previously stored data). The devices that provide data storage services may include hardware devices and/or logical devices. For example, storage 214 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 214 may include a memory device (e.g., a dual in line memory device) in which data is stored and from which copies of previously stored data are provided. In another example, storage 214 may include a persistent storage device (e.g., a solid-state disk drive) in which data is stored and from which copies of previously stored data is provided. In a still further example, storage 214 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 214 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

While illustrated in FIG. 2A as including a limited number of specific components, a data processing system in accordance with an embodiment may include fewer, additional, and/or different components than shown in FIG. 2A.

Figure 2C:
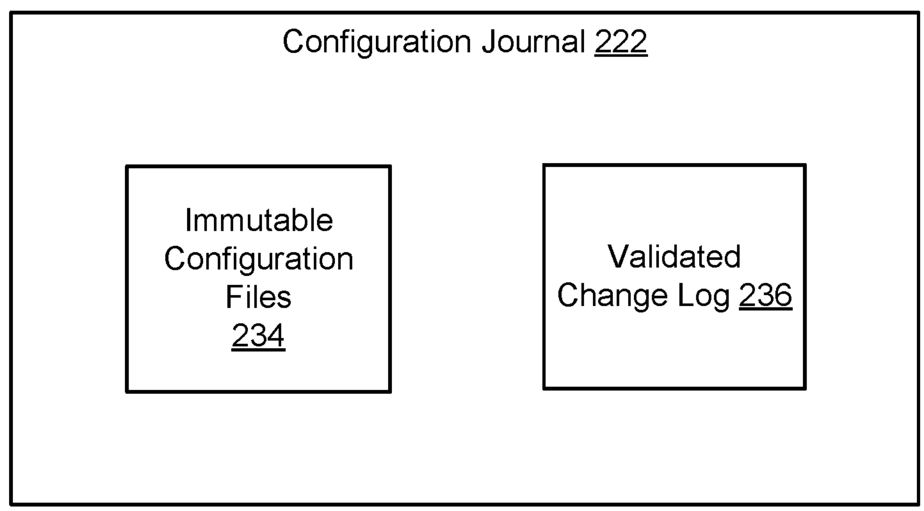
FIG. 2C shows a block diagram illustrating a configuration journal in accordance with an embodiment.

Turning to FIGS. 2B-2C, data structures usable by components of the system of FIG. 1-2A are shown. Any of these data structures may be implemented using, for example, lists, tables, databases, linked lists, and/or other type of data structures. Any of the data structures may be shared, spanned across multiple devices, and may be maintained and used by any number of entities. Additionally, while illustrated as including a limited amount of specific data, any of these data structures may include additional, less, and/or different data without departing from embodiments disclosed herein.

Turning to FIG. 2B, a diagram of boot image 220 in accordance with an embodiment is shown. Boot image 220 may include mutable section 232 and any number of other sections 230. Other sections 230 may include, for example, computer instructions (e.g., computer code) usable to instantiate applications or other types of entities (e.g., to run software), such as an operating system (which may act, in part, as an operations manager). In contrast, mutable section 232 may include configuration files or other data structures that define configurations, and which may include any number of malicious configurations. For example, malicious parties may utilize various attack vectors (e.g., malicious applications such as computer viruses) to modify mutable section 232. The malicious parties may do so, for example, to obtain copies of sensitive information that may otherwise not be obtainable but for the modifications made to mutable section 232. When doing so, the malicious parties may avoid scrutiny of the changes by validation systems such as authority manager 104. Consequently, the configurations of mutable section 232 may not be trustworthy.

Turning to FIG. 2C, a diagram of configuration journal 222 in accordance with an embodiment is shown. The configuration journal 222 may include immutable configuration files 234 (e.g., reflecting configurations in a past known good state) and validated change log 236. Immutable configuration files 234 may include the immutable base set of configurations described with respect to FIG. 2A. Validated change log 236 may include the cryptographically secure validated change log described with respect to FIG. 2A. Validated change log 236 may include validated changes to configurations of a data processing system (e.g., which may be obtained during the post-boot phase).

In an embodiment, the immutable base set of configurations (e.g., part of immutable configuration files 234) includes default configuration files from a manufacturer, retailer, or any other source of a known good set of configuration files. In an embodiment, validated change log 236 includes a set of cryptographically secured and validated changes from the default configuration files, and ordering information (ordering information that may be a cryptographic link between entries of the validated change log) for the validated changes. Consequently, the validated changes from validated change log 236 may be replayed with respect to the default configuration files to obtain a known good set of configurations (e.g., implemented with configuration files) for a data processing system.

Figure 3:
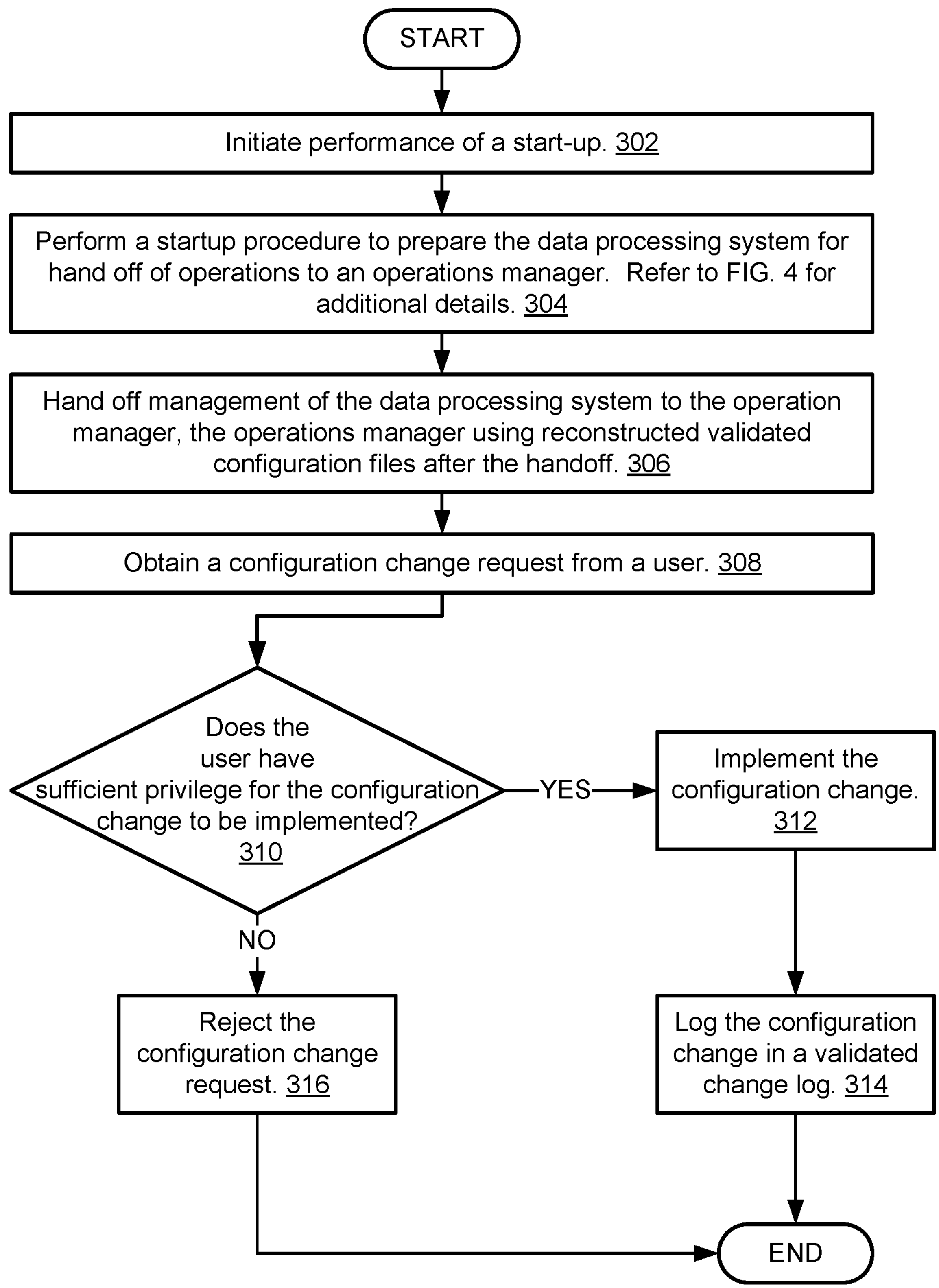
FIG. 3 shows a flow diagram illustrating methods of post-boot configuration security in a distributed system in accordance with an embodiment.
Figure 4:
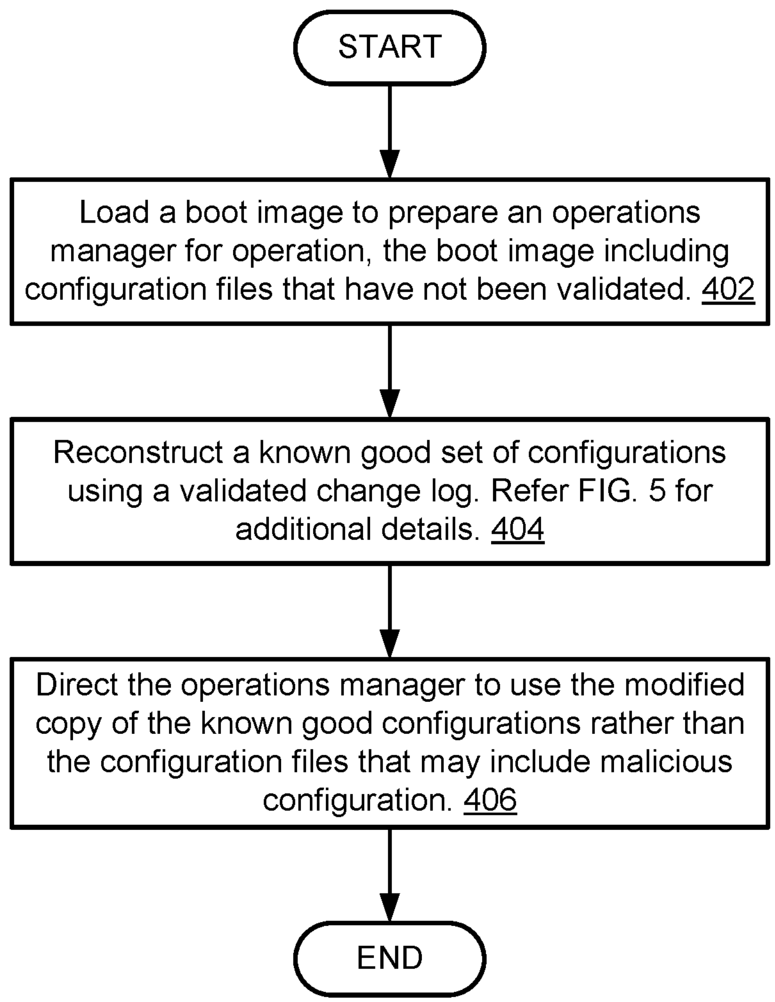
FIG. 4 shows a flow diagram illustrating methods of pre-boot configuration security in a distributed system in accordance with an embodiment.
Figure 5:
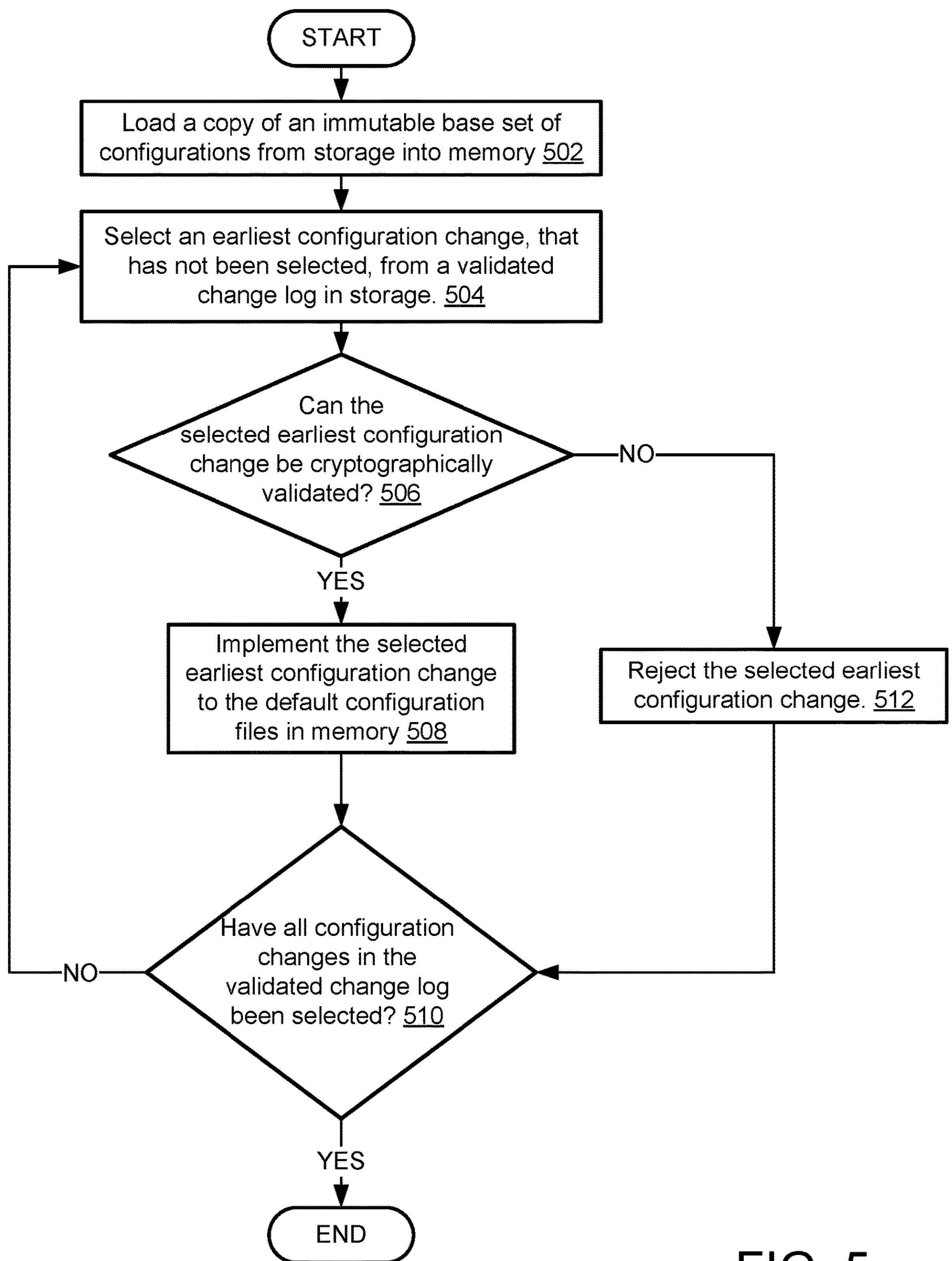
FIG. 5 shows a flow diagram illustrating methods of reconstructing configuration files for configuration security in a distributed system in accordance with an embodiment.

As discussed above, the system of FIGS. 1-2A may perform various methods for managing the security of data processing systems. FIGS. 3-5 illustrate methods that may be performed by any of the components of FIGS. 1-2A. While the methods illustrated in FIGS. 3-5 are illustrated with various operations performed in an order, any of the operations may be repeated, performed in different orders, and/or performed in parallel with or in a partially overlapping in time manner with other operations.

Turning to FIG. 3, a flow diagram illustrating a method for operating a data processing system in a manner that may enhance security of the data processing system by reducing the likelihood of malicious configurations being used by the data processing system in accordance with an embodiment is shown. The method illustrated in FIG. 3 may be performed, for example, by start-up manager 210, operations manager 212, and/or other entities.

At operation 302, a data processing system may initiate performance of a start-up. The performance of the startup may be initiated by (i) powering various hardware components of the data processing system, (ii) performing hardware inventorying and checking such as a power on self-test or other procedure, (iii) loading computer instructions corresponding to a startup manager, and (iv) beginning execution of the loaded computer instructions which may begin operation of the startup manager. The loaded computer instructions may be loaded, for example, from a secure storage, may be cryptographically validated, and/or may otherwise be managed in a manner that limits potential compromise of the data processing system via modification of the computer instructions.

At operation 304, a startup procedure may be performed to prepare the data processing system for hand off of operations (e.g., its operation) to an operations manager (e.g., 212). Performing the startup procedure may place the data processing system in a state where the operations manager utilizes a known good set of configurations during its operation rather than configurations that may include malicious configurations post hand-off.

The startup procedure may be performed via the method illustrated in FIG. 4. The startup procedure may be performed via other methods without departing from embodiments disclosed herein.

At operation 306, management of the data processing system may be handed off to the operations manager. The management of the data processing system may be handed to the operations manager by (i) initiating execution of computer instructions for the operations manager and/or (ii) terminating execution of computer instructions for the startup manager. As part of operation 304, the startup manager may have already reconstructed validated configuration files (e.g., known good configurations) which the operations manager begins to use post hand-off rather than other configurations that may include malicious configurations. By doing so, the data processing system may reduce the likelihood of implementing malicious configurations in its operation.

At operation 308, a configuration change request may be obtained from a user of the data processing system. The change request may be obtained by (i) reading the change request from storage, (ii) receiving, directly or indirectly, input from a user, the input indicating the change request, and/or (iii) via other processes.

The change request may include (i) information indicating a change to a configuration of the data processing system (or component thereof) and/or (ii) cryptographic data usable to ascertain whether the change request is valid. The cryptographic data may include any of: (i) an electronic signature (e.g., of the user), (ii) an identifier corresponding to the user that initiated the change request, (iii) a public key (e.g., which may be part of a public-private key pair for the user), (iii) hashes of various portions of the change request, and/or (iv) other types of information usable to validate the change request. An authority manager may, directly or indirectly (e.g., through key distribution), utilize the cryptographic data to validate change requests.

For example, consider a scenario in which a user is required to login to a data processing system for use of the data processing system. As part of the login process, the user may supply a password or other type of credential (and/or other factors in multifactor systems) which the data processing system may use to validate that the user has sufficient privilege for use of the data processing system. To do so, the data processing system may, directly or indirectly, use the credentials provided by the user to identify the privileges afforded to the user. The data processing system may do so by, for example, cooperating with an authority manager which may be the source of authority with respect to privileges afforded to various users. The authority manager may utilize the credentials and/or identifier of the user to identify the privileges afforded to the user. Once the privilege of the user is established, the data processing system may use various cryptographic information (e.g., the cryptographic data) associated with the user to sign requests by the user and/or perform various actions to enable requests by the user to be validated.

At operation 310, a determination may be made regarding whether the user has sufficient privilege for the configuration change indicated by the configuration change request to be implemented. The determination may be made by cryptographically checking the privilege of the user with respect to the privilege required for the configuration change request to be implemented.

The privilege of the user may be checked by analyzing the cryptographic data of (or otherwise linked to) the change request. To do so, an authority manager may compare identifiers from the cryptographic data to identifiers from a database of identifiers associated with various privileged users. If the identifier from the cryptographic data matches an identifier from the database, then the authority manager 104 may identify privileges corresponding to the matched identifier. The identified privileges may be compared to the privileges required for the change request to be implemented. Different types of change requests may require different privileges for the change requests to be implemented.

If the identified privileges meet those required for implementation of the change request, then the change may be treated as being valid. Otherwise the change request may be treated as being invalid.

If the change request is validated, then it may be determined that the user has sufficient privilege for the configuration change to be implemented, and the method may proceed to operation 312 following operation 310. Otherwise, the method may proceed to operation 316 following operation 310.

At operation 312, the configuration change may be implemented. The configuration change may be implemented by modifying the known good configurations which the operations manager utilizes in its operation based on the configuration change. The modification may cause the operations manager to implement the configuration change(s) indicated by the configuration change request.

At operation 314, the configuration change may be logged in the validated change log. The configuration change may be logged by adding, to the validated change log, (i) information regarding the configuration change, (ii) cryptographic data usable to validate the configuration change, and/or (iii) ordering information (cryptographic links between entries of the validated change log regarding the configuration change with respect to other configuration changes in the validated change log so that the configuration changes of the validated change log may be replayed in an order in which the configuration changes were originally made).

The method may end following operation 314.

Returning to operation 310, the method may proceed to operation 316 following operation 310 when the user does not have sufficient privilege for the configuration change to be implemented.

At operation 316, the configuration change request may be rejected. The configuration change request may be rejected by discarding the configuration change request without implementing any configuration changes indicated by the configuration change request. Consequently, information regarding the configuration changes indicated by the configuration change request may not be added to the validated change log.

The method may end following operation 316.

Using the method illustrated in FIG. 3, a system in accordance with an embodiment may be less likely to implement configuration changes that may be malicious or otherwise undesired.

Turning to FIG. 4, a flow diagram illustrating a method for performing a startup procedure in accordance with an embodiment is shown. The method illustrated in FIG. 4 may be performed, for example, by start-up manager 210, operations manager 212, and/or other entities.

At operation 402, the boot image is loaded to prepare an operations manager for operation. The boot image may include configuration files that have not been validated. The boot image may be loaded by reading the boot image from storage and storing the read boot image in memory.

At operation 404, a known good set of configurations are reconstructed using a validated change log. The known good set of configurations may be reconstructed by (i) loading a copy of known good configuration files (which may be stored in a configuration journal, e.g., from immutable configuration files 234) into memory, (ii) attempting to validate configuration changes from the validated change log, and (iii) implementing all validated configuration changes from the validated change log in an order in which the validated configuration changes were originally implemented. The validated configuration changes may be implemented by modifying the copy of the known good configuration files in accordance with the validated configuration changes.

The reconstruction of a known good set of configurations may be performed via the method illustrated in FIG. 5. The known good set of configurations may be reconstructed via other methods without departing from embodiments disclosed herein.

At operation 406, the operations manager is directed to use the modified copy of the known good configuration rather than the configuration files that may include malicious configurations. The operations manager may be directed to use the modified copy of the known good configuration by, for example, changing pointers, configurations, memory addresses (e.g., in which the modified copy of the known good configuration is stored), and/or data structures used by the operations manager to identify where configuration files are located in memory and/or storage. By doing so, the operations manager, upon operation, may use the modified copy of the known good configuration rather than the configuration files that may include malicious configurations.

The method may end following operation 406.

Using the method illustrated in FIG. 4, a system in accordance with an embodiment may be less likely to utilize configuration files that may be compromised or otherwise undesired through redirection of use of files stored in memory and/or storage.

Turning to FIG. 5, a flow diagram illustrating a method for reconstructing a known good set of configurations using a validated change log in accordance with an embodiment is shown. The method illustrated in FIG. 5 may be performed, for example, by start-up manager 210, operations manager 212, and/or other entities.

At operation 502, a mutable copy of an immutable base set of configurations (to be referred to as the mutable copy) from storage (e.g., configuration journal 222) is loaded into memory. The mutable copy may include default known good configurations. The mutable copy may be loaded by reading the default known good configurations (e.g., from a configuration journal) from storage and storing a copy of the read immutable configuration files in memory.

At operation 504, an earliest configuration change, that has not been selected, is selected from a validated change log in storage. The earliest configuration change may be selected by reviewing ordering information in the validated change log to identify the earliest configuration change. The identified earliest configuration change may be selected.

At operation 506, a determination is made regarding whether the selected earliest configuration change can be cryptographically validated. The determination may be made by using the cryptographic data associated (or cryptographically linked) with the selected earliest configuration change to (i) identify the user that made the configuration change request leading to the implementation of the selected earliest configuration change, (ii) cryptographically check the privilege of the user, with respect to the privilege required for the selected earliest configuration change to be implemented, and/or (iii) otherwise validate the selected earliest configuration change. An authority manager may, directly or indirectly (e.g., through key distribution), utilize the cryptographic data to validate the selected earliest configuration change as previously mentioned with respect to operation 310 from FIG. 3.

If the selected earliest configuration change is validated, then it may be determined that the source that originally requested the selected the earliest configuration change has sufficient privilege for the selected earliest configuration change to be implemented (or that the configuration change should be implemented for other reasons), and the method may proceed to operation 508 following operation 506. Otherwise, the method may proceed to operation 512 following operation 506.

At operation 508, the selected earliest configuration change is implemented to the default configuration files in memory. The selected earliest configuration change may be implemented by modifying the mutable copy of the immutable base set of configurations in memory based on the validated selected earliest configuration change. The modification may cause the operations manager to implement the selected earliest configuration change(s) when using the mutable copy to execute computing instructions during its operation.

At operation 510, a second determination may be made regarding whether all configuration changes in the validated change log have been selected. The second determination may be made by checking if there are one or more configuration changes in the validated change log that have not been selected. The checking may be performed using the ordering information to identify if any junior configuration changes are present with respect to the selected configuration change.

The method may proceed to operation 504 following operation 510 when there are one or more configuration changes in the validated change log that have not been selected. Otherwise, the method may end following operation 510. By returning to operation 504 following operation 510, each of the configuration changes of the validated change log may be sequentially considered for implementation (e.g., replayed) thereby facilitating reconstructions of a known, up to date, set of configuration files.

Returning to operation 506, the method may proceed to operation 512 following operation 506 when the selected earliest configuration change is not able to be validated.

At operation 512, the selected earliest configuration change may be rejected. The selected earliest configuration change may be rejected by discarding the selected earliest configuration change without implementing any configuration changes indicated by the selected earliest configuration change. Consequently, information regarding the selected earliest configuration change may be discarded.

Using the method illustrated in FIG. 5, a system in accordance with an embodiment may be less likely to implement configuration changes that may be malicious or otherwise undesired when reconstructing a known good set of configurations based on a validated change log.

Figure 6A:
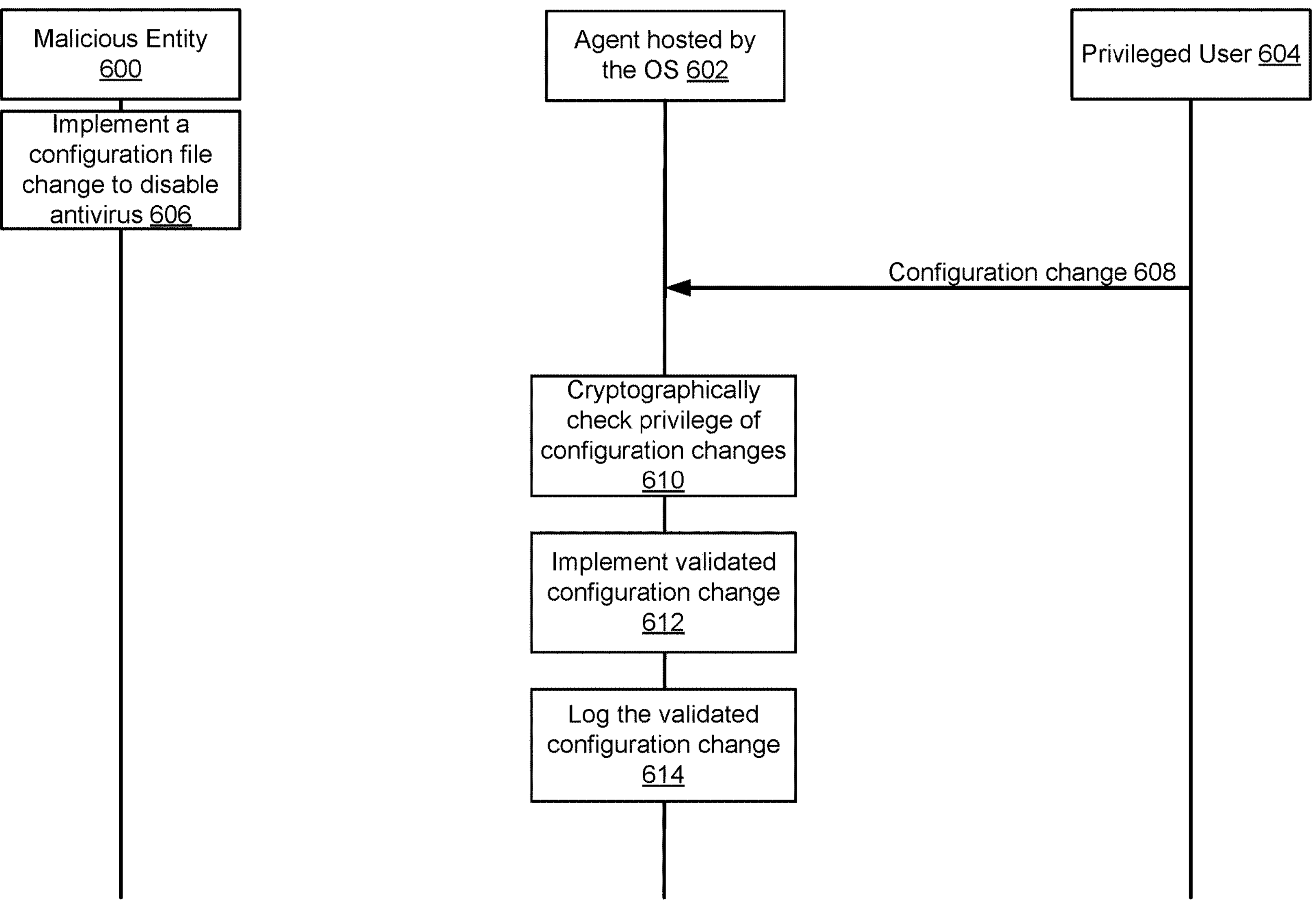
FIGS. 6A-6C show diagrams illustrating a system in accordance with an embodiment over time.
Figure 6B:
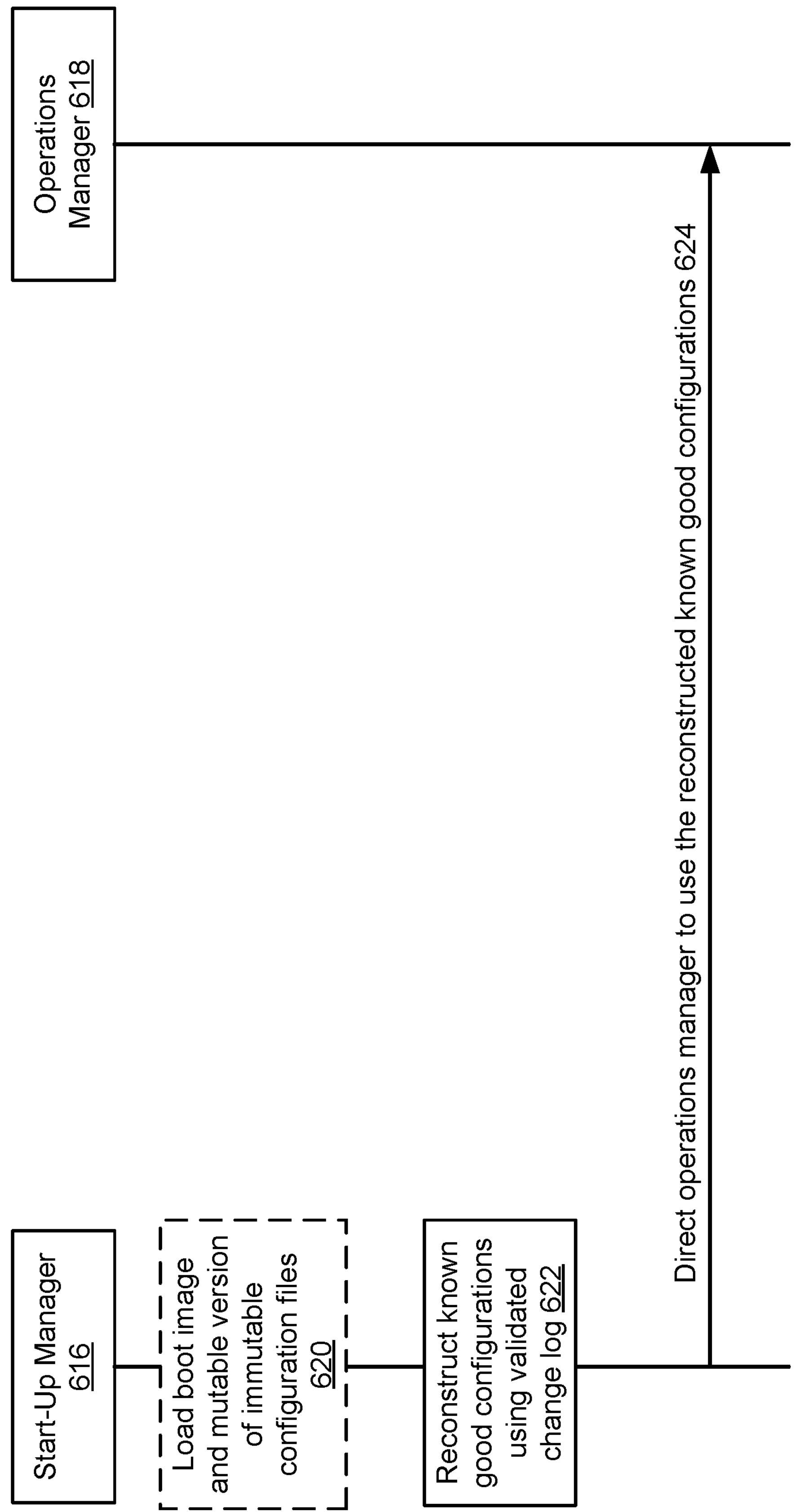
Figure 6C:
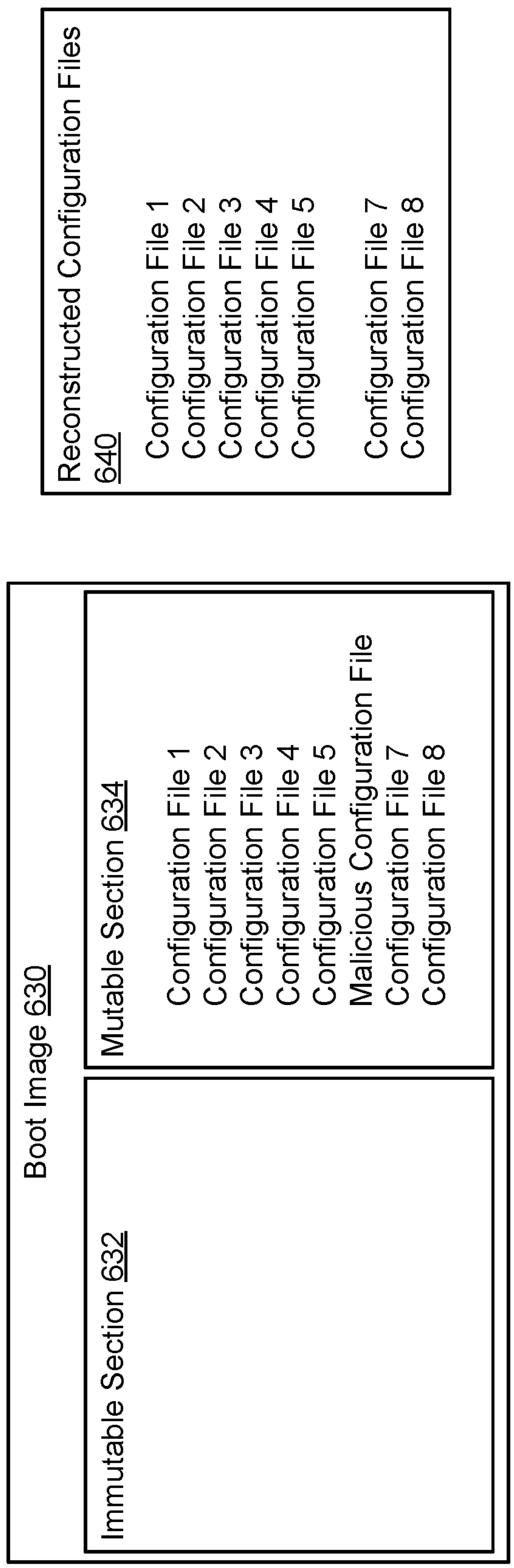

Turning to FIGS. 6A-6C, diagrams illustrating actions that may be performed by and/or data structures that may be used by components of a system similar to that of FIG. 1 in accordance with an embodiment is shown. In FIGS. 6A-6C, actions performed by various components and interactions between components (e.g., data transmissions) are shown. The actions performed by the respective components are shown with boxes in alignment with the line descending from the box representing the respective component of the system. Interactions between components are illustrated with arrows interconnecting the lines descending from the boxes. Generally, the actions and interactions are ordered as may be performed in a temporal order with earlier actions/interactions being towards the top of the page and later performed actions/interactions being towards the bottom of the page. The actions/interactions may be performed in other orders.

Turning to FIG. 6A, consider an example where a data processing system (e.g., a computing device) may be utilized by a privileged user 604. During utilization of the computing device, the privileged user may desire to modify configuration settings in order to personalize the privileged user's utilization of the computing device.

A third party, such as malicious entity 600, may utilize various attack vectors (e.g., malicious applications such as computer viruses) to modify configuration settings (e.g., implement malicious configurations) of the computing device to obtain copies of sensitive information for the privileged user stored in the computing device that may otherwise not be obtainable but for the modifications made to the configuration settings by the malicious entity. To manage the risk of malicious modifications of configuration giving rise to compromise of the computing device, an agent hosted by the operating system (OS) 602 of the computing device may use a constructed validated change log to reconstruct known good configurations and use the reconstructed known good configurations instead of configurations that may be compromised by malicious entity 600. Through these interactions, the agent hosted by the OS 602 may identify configuration changes made by the privileged user and implement the configuration changes by the privileged user, while discriminating against configuration changes made by third parties without privilege to make configuration changes. By doing so, the configuration changes made by malicious entity 600 (or other unprivileged entities) may not be implemented and subsequently used by the computing device during its operation.

For example, malicious entity 600 may, at block 606, implement a configuration file change to disable antivirus used by the computing device to compromise the computing device. The configuration change may be to not load the antivirus as part of the operation of the operating system. The configuration change implemented by malicious entity 600 may use implementation paths that avoid the scrutiny of validation systems. Consequently, the configuration of the computing device may be modified even while validation processes are in place that attempt to prevent such configuration changes from being implemented. Accordingly, if left unchecked, these configuration changes implemented by malicious entity 600 may place the computing device in a compromised state through which other undesired operations may be enabled.

To reduce the impact of these configuration changes implemented by malicious entity 600, when privileged user 604, at block 608, proceeds to change the configuration to personalize the computing device, the computing device (and agent hosted thereby) may, at block 610, cryptographically check privilege of configuration changes being requested through normal channels. The agent hosted by the OS 602 may cryptographically check the privilege of a requestor by using identifiers from cryptographic data associated with the request to identify the requestor. After privileged user 604 is identified, the privilege associated with privileged user 604 may be determined by comparing identifiers from the cryptographic data to identifiers from a database of identifiers associated with various privileged users. Different types of change requests may require different privileges for the change requests to be implemented. If the identifier from the cryptographic data matches an identifier from the database, then the privileges corresponding to the matched identifier may be checked to make a determination regarding whether privileged user 604 has enough privilege to make the configuration change. Other methods may be used to ascertain whether a configuration change request should be implemented based on a privilege of the requestor without departing from embodiments disclosed herein.

In this example, it may be determined that privileged user 604 has sufficient privilege to make the request to personalize the computing device and therefore have the agent hosted by the OS 602 validate the configuration change from privileged user 604.

In contrast, the configuration change made by malicious entity 600 may not be validated due to (i) the agent hosted by the OS 602 not being able to identify the malicious entity 600 based on the cryptographic data if the malicious entity 600 attempts to implement the configuration change through impersonation of a low privilege user, (ii) if identified, malicious entity 600 may there not have sufficient privilege associated to the identity of the malicious entity 600 to disable antivirus, and/or (iii) the agent hosted by the OS 602 may not review the change if done in a manner that bypasses privilege checking such as direct modification of a configuration file that includes the antivirus configuration.

At block 612, the agent hosted by the OS 602 may implement validated configuration changes to the configuration settings. The validated configuration change made by the privileged user 604 may be implemented thereby resulting in the operation of the computing device being personalized for privileged user 604.

At block 614, the agent hosted by the OS 602 may log the validated configuration change that was implemented, and any associated data of the validated configuration change (e.g., cryptographic data and/or ordering information; to be used to replay the validated configuration changes during reconstruction of known good configurations in the same order the validated configuration changes were originally implemented during operation of the computing device), in a validated change log. The validated change log may serve as a record of only the validated configuration changes implemented to the configuration files during operation of the computing device. Other changes that are not validated may not be added.

Although the agent hosted by the OS 602 implements and logs validated configuration changes, the configuration files of the computing device may be compromised because malicious entity 600 may modify the configuration files through mechanisms that avoid validation processes.

Turning to FIG. 6B, continuing from the example of FIG. 6A, if the computing device is rebooted (or restarted for other reasons), then the validated change log may be utilized in the reconstruction of known good configurations during startup procedures of the computing device.

For example, the agent hosted by the OS 602 may include start-up manager 616 and operations manager 618, where the start-up manager 616 may facilitate the operation of startup procedures.

At block 620, start-up manager 616 may load a boot image and a mutable version of immutable configurations files into memory from storage. The boot image may include computer instructions usable to run software, such as an operating system, and configuration files, or other data structures that define configurations, which may include any number of malicious configurations due to the various possibilities of malicious attacks. The mutable version of the immutable configuration files may include default configurations (e.g., a known good set of configurations from a past state of the computing device). The mutable version of immutable configuration files may include a copy of the immutable configuration files, to be used as a foundation for implementing validated configuration changes from the validated change log during the process of reconstructing known good configurations.

At block 622, start-up manager 616 may reconstruct known good configurations using the validated change log. Known good configuration may be reconstructed by replaying the implementation of validated configuration changes from the validated change log onto the mutable version of immutable configuration files. The implementation of validated configuration files may be replayed by (i) selecting an earliest configuration change from the validated change log, that has not been selected, based on ordering information associated to the selected earliest configuration change, (ii) making a determination, using the cryptographic data associated with the selected earliest configuration change, regarding whether the source that originally requested the selected earliest configuration change had enough privilege to make the request, (iii) validating the selected earliest configuration change if the source of the request had enough privilege to make the request, and/or (iv) implementing the selected earliest configuration change onto the mutable version of immutable configuration files only if the selected earliest configuration change is validated. Reconstruction of known good configurations may end following each configuration change in the validated change log being selected, cryptographically checked, and implemented if validated.

After completing reconstruction of the known good configurations, at block 624, the start-up manager 616 may direct operations manager 618 to use the reconstructed known good configurations instead of the configuration files that may include malicious configurations. The operations manager may proceed to use the reconstructed known good configurations during its operation instead of configuration files that may compromise the computing device.

Turning to FIG. 6C, differences between the reconstructed configuration files and configuration files that may be compromised are illustrated. As seen in FIG. 6C, Boot image 630 includes immutable section 632 and mutable section 634. Immutable section 632 may include computer instructions usable to run software (e.g., an operating system), while mutable section 634 may include configuration files that have been compromised by malicious entity 600 through modification of a configuration file into a malicious configuration file. The malicious configuration file may include a malicious configuration with instructions for operations manager 618 to disable automatic updates for the operating system of the computing device or the antivirus upon startup, as noted above.

In contrast, reconstructed configuration files 640 may include validated configuration files, and may not include the malicious configuration file present in mutable section 634. The utilization of reconstructed configuration files 640 instead of mutable section 634 by operations manager 618 may lead to instructions from the malicious configuration file remaining unread by operations manager 618 during its operation, and resulting in operations manager 618 not disabling automatic updates for the operating system or antivirus of the computing device.

As shown in FIGS. 6A-6C, embodiments disclosed herein may construct a validated change log and use the validated change log to reconstruct known good configurations for a data processing system. By doing so, a data processing system may be more likely to operate in a desired manner.

Figure 7:
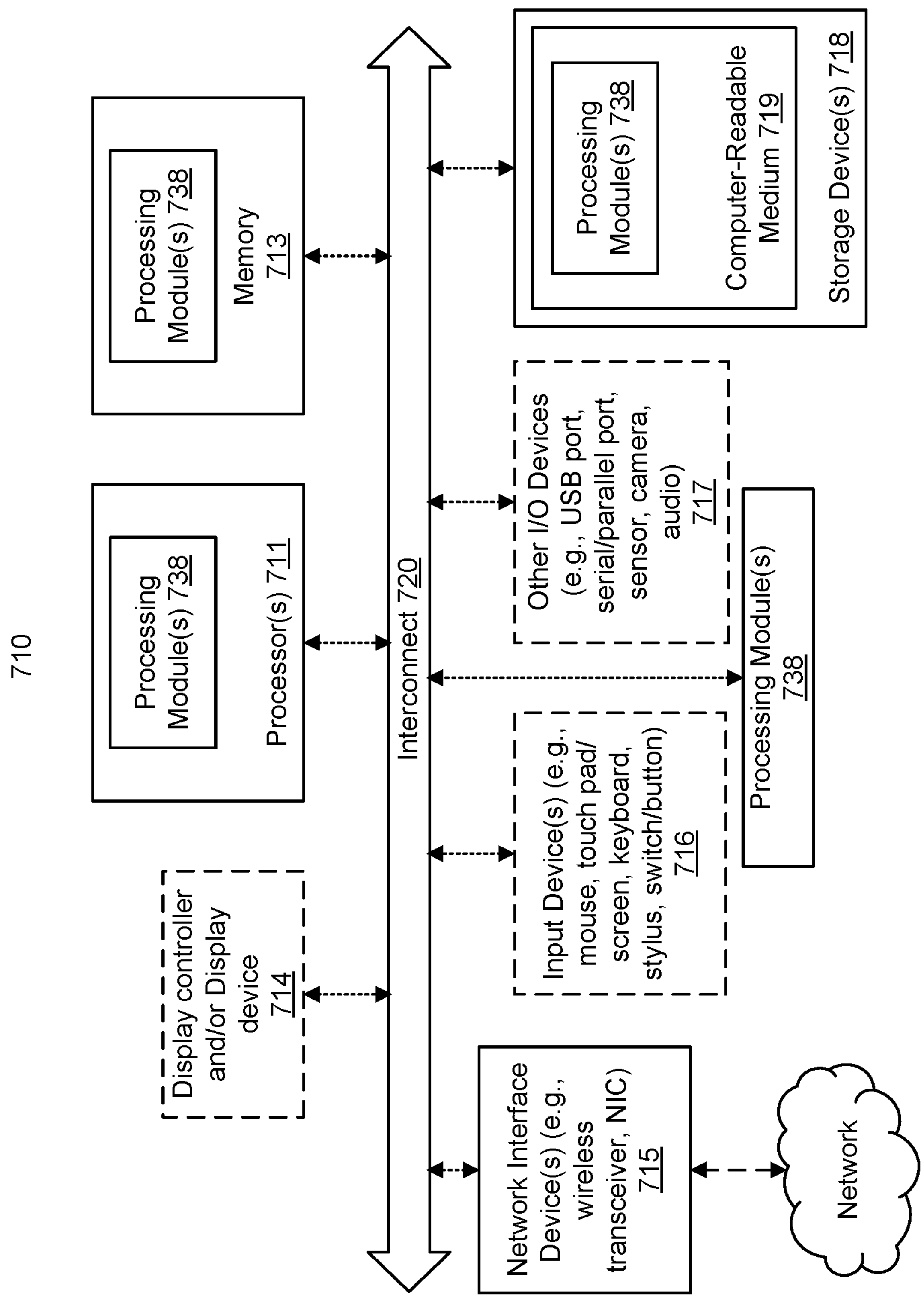
FIG. 7 shows a block diagram illustrating a data processing system in accordance with an embodiment.

Any of the components illustrated in FIGS. 1-6C may be implemented with one or more computing devices. Turning to FIG. 7, a block diagram illustrating an example of a data processing system (e.g., a computing device) in accordance with an embodiment is shown. For example, system 710 may represent any of data processing systems described above performing any of the processes or methods described above. System 710 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 710 is intended to show a high level view of many components of the computer system. However, it is to be understood that additional components may be present in certain implementations and furthermore, different arrangement of the components shown may occur in other implementations. System 710 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 710 includes processor 711, memory 713, and devices 715-717 via a bus or an interconnect 720. Processor 711 may represent a single processor or multiple processors with a single processor core or multiple processor cores included therein.

Processor 711 may represent one or more general-purpose processors such as a microprocessor, a central processing unit (CPU), or the like. More particularly, processor 711 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 711 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 711, which may be a low power multi-core processor socket such as an ultra-low voltage processor, may act as a main processing unit and central hub for communication with the various components of the system. Such processor can be implemented as a system on chip (SoC). Processor 711 is configured to execute instructions for performing the operations discussed herein. System 710 may further include a graphics interface that communicates with optional graphics subsystem 714, which may include a display controller, a graphics processor, and/or a display device.

Processor 711 may communicate with memory 713, which in one embodiment can be implemented via multiple memory devices to provide for a given amount of system memory. Memory 713 may include one or more volatile storage (or memory) devices such as random access memory (RAM), dynamic RAM (DRAM), synchronous DRAM (SDRAM), static RAM (SRAM), or other types of storage devices. Memory 713 may store information including sequences of instructions that are executed by processor 711, or any other device. For example, executable code and/or data of a variety of operating systems, device drivers, firmware (e.g., input output basic system or BIOS), and/or applications can be loaded in memory 713 and executed by processor 711. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 710 may further include IO devices such as devices (e.g., 715, 717, 717, 718) including network interface device(s) 715, optional input device(s) 717, and other optional IO device(s) 717. Network interface device(s) 715 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 717 may include a mouse, a touch pad, a touch sensitive screen (which may be integrated with a display device of optional graphics subsystem 714), a pointer device such as a stylus, and/or a keyboard (e.g., physical keyboard or a virtual keyboard displayed as part of a touch sensitive screen). For example, input device(s) 717 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity data collector arrays or other elements for determining one or more points of contact with the touch screen.

IO devices 717 may include an audio device. An audio device may include a speaker and/or a microphone to facilitate voice-enabled functions, such as voice recognition, voice replication, digital recording, and/or telephony functions. Other IO devices 717 may further include universal serial bus (USB) port(s), parallel port(s), serial port(s), a printer, a network interface, a bus bridge (e.g., a PCI-PCI bridge), data collector(s) (e.g., a motion data collector such as an accelerometer, gyroscope, a magnetometer, a light data collector, compass, a proximity data collector, etc.), or a combination thereof. IO device(s) 717 may further include an imaging processing subsystem (e.g., a camera), which may include an optical data collector, such as a charged coupled device (CCD) or a complementary metal-oxide semiconductor (CMOS) optical data collector, utilized to facilitate camera functions, such as recording photographs and video clips. Certain data collectors may be coupled to interconnect 720 via a data collector hub (not shown), while other devices such as a keyboard or thermal data collector may be controlled by an embedded controller (not shown), dependent upon the specific configuration or design of system 710.

To provide for persistent storage of information such as data, applications, one or more operating systems and so forth, a mass storage (not shown) may also couple to processor 711. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 711, e.g., via a serial peripheral interface (SPI). This flash device may provide for non-volatile storage of system software, including a basic input/output software (BIOS) as well as other firmware of the system.

Storage device 718 may include computer-readable storage medium 719 (also known as a machine-readable storage medium or a computer-readable medium) on which is stored one or more sets of instructions or software (e.g., processing module, unit, and/or processing module/unit/logic 738) embodying any one or more of the methodologies or functions described herein. Processing module/unit/logic 738 may represent any of the components described above. Processing module/unit/logic 738 may also reside, completely or at least partially, within memory 713 and/or within processor 711 during execution thereof by system 710, memory 713 and processor 711 also constituting machine-accessible storage media. Processing module/unit/logic 738 may further be transmitted or received over a network via network interface device(s) 715.

Computer-readable storage medium 719 may also be used to store some software functionalities described above persistently. While computer-readable storage medium 719 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 738, components and other features described herein can be implemented as discrete hardware components or integrated in the functionality of hardware components such as ASICS, FPGAs, DSPs or similar devices. In addition, processing module/unit/logic 738 can be implemented as firmware or functional circuitry within hardware devices. Further, processing module/unit/logic 738 can be implemented in any combination hardware devices and software components.

Note that while system 710 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing operation of a data processing system to prevent implementation of malicious configurations, the method comprising:

obtaining, by a start-up manager of the data processing system, a boot image comprising an immutable section and a mutable section comprising a malicious configuration of the malicious configurations;

obtaining, by the start-up manager, a configuration journal comprising an immutable base set of configurations and a cryptographically secure validated change log;

obtaining, by the start-up manager, a mutable copy of the immutable base set of configurations;

constructing, by the start-up manager, validated configurations using the mutable copy of the immutable configurations and cryptographically secure validated changes from the cryptographically secure validated change log; and directing, by the start-up manager, an operations manager to use the validated configurations instead of configurations from the mutable section of the boot image, the configurations from the mutable section of the boot image comprising the malicious configuration.

2. The computer-implemented method of claim 1, further comprising:

prior to obtaining the boot image;

obtaining, by the operations manager, a configuration change request from a privileged user;

making a determination, by the operations manager, that the configuration change request from the privileged user is validated;

implementing, by the operations manager and based on the determination, any configuration changes indicated by the configuration change request from the privileged user; and updating, by the operations manager, the cryptographically secure validated change log based on the configuration changes indicated by the configuration change request.

3. The computer-implemented method of claim 2, further comprising:

prior to obtaining the boot image;

obtaining, by the operations manager, a second configuration change request;

making a second determination, by the operations manager, that the second configuration change request is not validated; and rejecting, by the operations manager and based on the second determination, the second configuration change without adding any information regarding the second configuration change request to the cryptographically secure validated change log.

4. The computer-implemented method of claim 2, wherein the determination is made by:

identifying a required level of privilege for the configuration changes indicated by the configuration change request; and identifying that the privileged user has a level of privilege meeting the required level of privilege.

5. The computer-implemented method of claim 2, wherein the cryptographically secure validated change log is updated by:

adding an entry to the cryptographically secure validated change log, the entry indicating a temporal relationship to other entries of the cryptographically secure validated change log;

adding information regarding the configuration changes indicated by the configuration change request to the added entry; and establishing cryptographic security for the added entry.

6. The computer-implemented method of claim 5, wherein the cryptographic security is established by:

generating a signature for the added entry, the signature being generated, at least in part, using an identifier of the privileged user; and associating the generated signature with the added entry.

7. The computer-implemented method of claim 6, wherein the cryptographic security is further established by:

generating a cryptographic link between the added entry and another entry of the cryptographically secure validated change log, wherein the other entry of the cryptographically secure validated change log is an immediately temporally junior entry of the cryptographically secure validated change log to the added entry.

8. The computer-implemented method of claim 1, wherein the malicious configuration of the malicious configurations is implemented by an entity that does not have sufficient privilege to make the malicious configuration.

9. The computer-implemented method of claim 8, wherein the entity comprises a malicious computer application hosted by the data processing system.

10. The computer-implemented method of claim 1, further comprising:

handing off operation of the data processing system to the operations manager, the operations manager exclusively using the validated configurations to define the operations manager's operation and ignoring the malicious configuration change to define the operations manager's operation.

11. A non-transitory machine-readable medium having instructions stored therein, which when executed by a processor, cause the processor to perform operations for managing operation of a data processing system to prevent implementation of malicious configurations, the operations comprising:

obtaining, by a start-up manager of the data processing system, a boot image comprising an immutable section and a mutable section comprising a malicious configuration of the malicious configurations;

obtaining, by the start-up manager, a configuration journal comprising an immutable base set of configurations and a cryptographically secure validated change log;

obtaining, by the start-up manager, a mutable copy of the immutable base set of configurations;

constructing, by the start-up manager, validated configurations using the mutable copy of the immutable configurations and cryptographically secure validated changes from the cryptographically secure validated change log; and directing, by the start-up manager, an operations manager to use the validated configurations instead of configurations from the mutable section of the boot image, the configurations from the mutable section of the boot image comprising the malicious configuration.

12. The non-transitory machine-readable medium of claim 11, wherein the operations further comprise:

prior to obtaining the boot image;

obtaining, by the operations manager, a configuration change request from a privileged user;

making a determination, by the operations manager, that the configuration change request from the privileged user is validated;

implementing, by the operations manager and based on the determination, any configuration changes indicated by the configuration change request from the privileged user; and updating, by the operations manager, the cryptographically secure validated change log based on the configuration changes indicated by the configuration change request.

13. The non-transitory machine-readable medium of claim 12, wherein the operations further comprise:

prior to obtaining the boot image;

obtaining, by the operations manager, a second configuration change request;

making a second determination, by the operations manager, that the second configuration change request is not validated; and rejecting, by the operations manager and based on the second determination, the second configuration change without adding any information regarding the second configuration change request to the cryptographically secure validated change log.

14. The non-transitory machine-readable medium of claim 12, wherein the determination is made by:

identifying a required level of privilege for the configuration changes indicated by the configuration change request; and identifying that the privileged user has a level of privilege meeting the required level of privilege.

15. The non-transitory machine-readable medium of claim 12, wherein the cryptographically secure validated change log is updated by:

adding an entry to the cryptographically secure validated change log, the entry indicating a temporal relationship to other entries of the cryptographically secure validated change log;

adding information regarding the configuration changes indicated by the configuration change request to the added entry; and establishing cryptographic security for the added entry.

16. A data processing system, comprising:

a processor; and a memory coupled to the processor to store instructions, which when executed by the processor, cause the processor to perform operations for managing operation of the data processing system to prevent implementation of malicious configurations by the data processing system, the operations comprising:

obtaining, by a start-up manager of the data processing system, a boot image comprising an immutable section and a mutable section comprising a malicious configuration of the malicious configurations;

obtaining, by the start-up manager, a configuration journal comprising an immutable base set of configurations and a cryptographically secure validated change log;

obtaining, by the start-up manager, a mutable copy of the immutable base set of configurations;

constructing, by the start-up manager, validated configurations using the mutable copy of the immutable configurations and cryptographically secure validated changes from the cryptographically secure validated change log; and directing, by the start-up manager, an operations manager to use the validated configurations instead of configurations from the mutable section of the boot image, the configurations from the mutable section of the boot image comprising the malicious configuration.

17. The data processing system of claim 16, wherein the operations further comprise:

prior to obtaining the boot image;

obtaining, by the operations manager, a configuration change request from a privileged user;

making a determination, by the operations manager, that the configuration change request from the privileged user is validated;

implementing, by the operations manager and based on the determination, any configuration changes indicated by the configuration change request from the privileged user; and updating, by the operations manager, the cryptographically secure validated change log based on the configuration changes indicated by the configuration change request.

18. The data processing system of claim 17, wherein the operations further comprise:

prior to obtaining the boot image;

obtaining, by the operations manager, a second configuration change request;

making a second determination, by the operations manager, that the second configuration change request is not validated; and rejecting, by the operations manager and based on the second determination, the second configuration change without adding any information regarding the second configuration change request to the cryptographically secure validated change log.

19. The data processing system of claim 17, wherein the determination is made by:

identifying a required level of privilege for the configuration changes indicated by the configuration change request; and identifying that the privileged user has a level of privilege meeting the required level of privilege.

20. The data processing system of claim 17, wherein the cryptographically secure validated change log is updated by:

adding an entry to the cryptographically secure validated change log, the entry indicating a temporal relationship to other entries of the cryptographically secure validated change log;

adding information regarding the configuration changes indicated by the configuration change request to the added entry; and establishing cryptographic security for the added entry.

* * * * *